United States Patent [19]  [11]  4,067,199
Jegousse  [45]  Jan. 10, 1978

[54] METHOD AND APPARATUS OF LAUNCHING FLOATS TO LIGHTEN UNDERWATER CONDUITS

[75] Inventor: Michel J. Jegousse, Nantes, France

[73] Assignees: Compagnie Francaise des Petroles, Paris Cedex; Etudes Petrolieres Marines, Societe Responsabilite Limitee, Paris; Ateliers et Chantiers de Bretagne, A.C.B., Societe Anonyme, Nantes; Compagnie Maritime d'Expertises, Societe Anonyme, Marseille; Compagnie Generale pour les Developpements Operationnels des Richesses Sous-Marines (Doris), Societe Anonyme; Entreprise de Recherches et d'Activites Petrolieres (E.R.A.P.) Etablissement public, both of Paris, all of France

[21] Appl. No.: 598,916

[22] Filed: July 24, 1975

[30] Foreign Application Priority Data

Aug. 5, 1974 France .............................. 74.27075

[51] Int. Cl.² .............................................. F16L 1/04
[52] U.S. Cl. .......................................... 61/63; 9/8 R; 61/107
[58] Field of Search ...................... 61/69 R, 72.3, 107, 61/63; 9/9, 33, 8 R

[56] References Cited

U.S. PATENT DOCUMENTS

| 3,262,275 | 7/1966  | Perret ............................. 61/72.3 |
| 3,620,028 | 11/1971 | Wilde ............................. 61/72.3 |
| 3,727,417 | 4/1973  | Shaw .............................. 61/72.3 |
| 3,795,115 | 3/1974  | Bergquist et al. .............. 61/72.3 |

FOREIGN PATENT DOCUMENTS

| 661,070 | 3/1964  | Italy ................................... 61/72.3 |
| 25,670  | 3/1914  | United Kingdom ....................... 9/9 |
| 942,218 | 11/1963 | United Kingdom ................. 61/72.3 |

Primary Examiner—Paul R. Gilliam
Assistant Examiner—David H. Corbin
Attorney, Agent, or Firm—Sughrue, Rothwell, Mion, Zinn and Macpeak

[57]  ABSTRACT

To enable the release and consequent recovery of a support float which supports a load, e.g. a pipe, as it is lowered to the sea bed, a marker buoy is lowered with the float to be released when the load reaches the sea bed, the marker buoy having an inflated flexible envelope which is trapped in a housing fast with the float and having an opening through which the float can escape only when it has been compressed to a predetermined extent under the effects of a predetermined hydrostatic pressure. The marker buoy is connected to the float by a cable and the float is released from the load either by operations on that cable, or on a release cable connected to the float, on appearance of the marker buoy at the water surface.

16 Claims, 9 Drawing Figures

METHOD AND APPARATUS OF LAUNCHING FLOATS TO LIGHTEN UNDERWATER CONDUITS

The invention refers to the release and recovery of floats for lightening pipes, supporting loads as they are lowered underwater employed particularly but not exclusively for use in the sinking of pipelines.

It is usual to facilitate the laying of pipes on the sea bed by supporting them during lowering by means of floats. These floats are attached to the pipe-line as it is assembled on a laying barge and as it slides along a guide-ramp into the sea, the floats enabling the pipe-line to adopt a suitable slope and curvature in the water which minimises risk of fracture or permanent deformation of the pipe-line. In order to ensure that the pipe-line has a suitable stability when lying on the seabed, the support floats are freed and for this purpose suitable release means are provided.

Where the sea is fairly deep divers are no longer used to free the support floats, automatic release means being employed instead. Such a release means may comprise a manometric device which measures the ambient hydrostatic pressure and transmits tripping instructions to a release mechanism when the hydrostatic pressure corresponding with the required depth of the pipe is reached. The release mechanism which is generally pyrotechnical or mechanical thus frees the support float at the chosen depth. The release means may alternatively comprise a time-controlled system with a clock or a soluble pellet or an even more elaborate system emitting electro-acoustic waves coded with a view to controlling release from the surface. However, whatever the device employed, there is always the risk of faulty operation because of lack of reliability of the device which is too complicated or there are difficulties in the use of a less elaborate device, the adjustment of which is much less accurate.

It is an object of the invention to provide a method of release and recovery of a float for supporting a load during submersion using a marker buoy, wherein an elastically deformable buoy is subordinated to the descent of the load during submersion by putting it in a housing having at least one opening the size of which is adjusted so that the deformation of the buoy under the effects of the hydrostatic pressure at a predetermined depth permits its free passage out of the housing and its return to the surface, the buoy being connected to release means for at least partial release of a support float.

When used in laying a pipe-line, it is sufficient to select the depth at which the marker buoy is to escape so that this depth corresponds with the required depth of the pipe such that even accidental freeing of the support float under the control of the release means to which the marker buoy is connected brings about neither fracture nor permanent deformation of the pipe. This condition is all the easier to fulfil as all the other support floats will perforce be at a depth less than that of the one which has been freed accidentally, these floats for this reason being unable to be and under no circumstances being freed since the correspondence marker buoys are at too high a level.

This method has the further advantage of reliability since it does not use any manometric, electrical or acoustic relay, but only uses the deformation to the buoy resulting from the hydrostatic pressure of the sea bringing about freeing of the buoy and the consequent access to the release means for release of the support float.

This method may also be applied to a marker buoy which is not connected to release means for release of the corresponding support float, this arrangement being particularly useful to the case where the marker buoy corresponds with an assembly of support floats, accidental release of which would introduce a risk of causing permanent deformation of the load, e.g. the pipe.

Another object of the invention is apparatus for use in carrying out the method described above, comprising a marker buoy having a cable connected to a release means of a corresponding support float or floats, said cable passing through part of means connecting said float or floats to the load such that a pull exerted on said release cable will release said float or floats from said load.

Thus as soon as the marker buoy has been automatically freed when the load, e.g. a pipe, has reached the required depth, it is a simple matter to cause the release of the corresponding float or floats from a recovery vessel whilst operations of submerging further sections of the pipe are pursued using a laying barge.

The apparatus is particularly convenient and flexible because, having adjusted the freeing of the marker buoy to the required depth, one can be substantially certain that the load has reached the depth desired. Release of the floats can be effected at a convenient moment since it results from the pull exerted on the release cable from the recovery vessel. Finally, in the case in which the depth is not very great and consequently freeing of the support floats can be carried at a relatively small distance from the laying-barge, the cable carrying the release means can be run along the submerged pipe, and the marker buoy may simply have a rope connected to a point on the support float. Release of the float from the load is then effected directly from the laying-barge by simply pulling on the cable after the appearance of the marker buoy on the surface of the water.

The invention will be more fully understood from the following description of embodiments according of the invention given by way of example only, with reference to the accompanying drawings.

Figure 1:
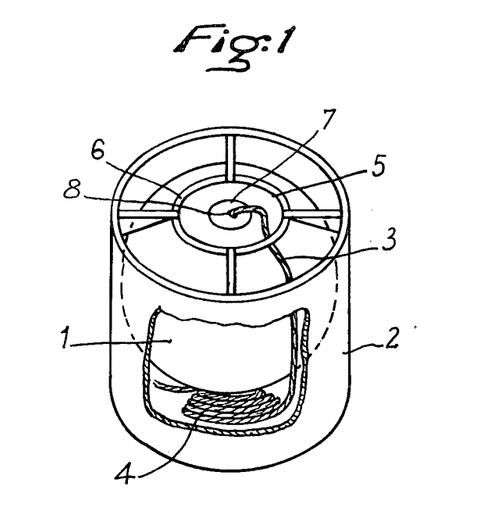
FIG. 1 is a perspective view of an embodiment of a marker buoy in accordance with the invention.

As shown in FIG. 1, a marker buoy 1 comprises an elastic or flexible envelope which is introduced after deflation into a housing or receptacle 2 which is cylindrical as shown but can be of any shape, and has at the top an opening 5. This opening 5 may have a fixed diameter or one which is discretely adjustable by the use of gauge rings, such as the ring 6. Fixing of the ring 6 may be done in any suitable manner. The ring 6 may, for example, be mounted on hinges, to facilitate the introducton of the buoy into the receptacle. Alternatively the buoy may be introduced into the receptacle through another opening which is then closed.

Figure 2:
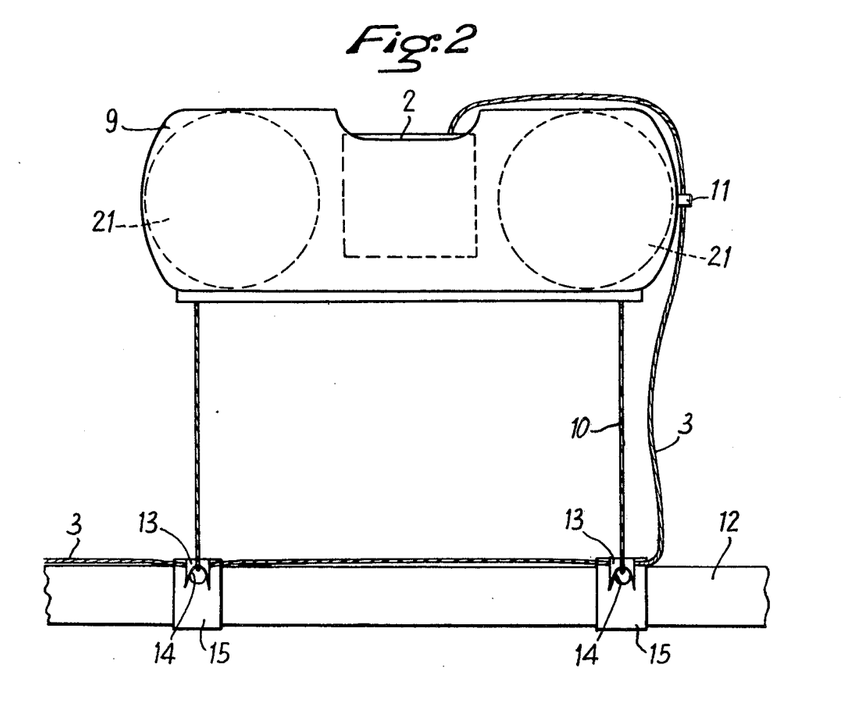
FIG. 2 is an elevation of a support float in accordance with the invention.
Figure 3:
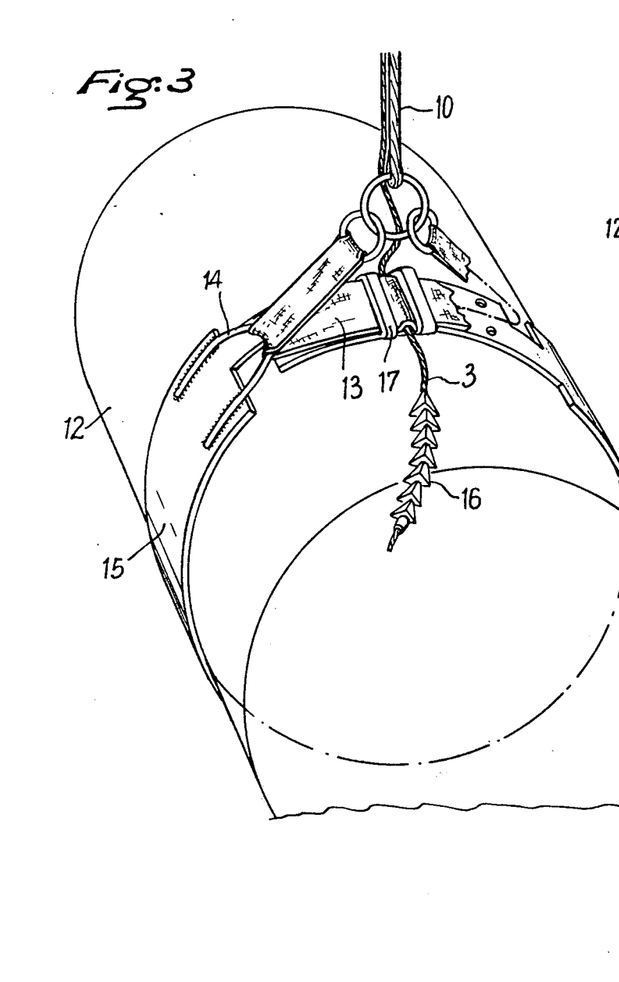
FIG. 3 is a perspective view of an embodiment of release means in accordance with the invention.

A release cable 3 fixed by one end at 8 to the buoy is coiled or made into a ball to constitute a reserve 4, the other end of the cable being connected to release means of a support float 9, FIG. 2. In the event that it is not desired to control release from a vessel other than the laying-barge, the cable 3 may be made fast with float 9 or any element fast with the float 9. Adjustment of the depth at which the buoy 1 will be released from the receptacle 2 is effected by acting on one or both of the diameter of the aperture 5 in the receptacle 2 and the internal pressure in the buoy 1 which is inflated by means of a valve 7. The receptacle 2 is fixed to the support float and is shown diagrammatically in FIG. 2 between two watertight compartments 21 of the float. The release cable 3 extends beside a rope 10 for attachment of the float 9 to the pipe 12 and may be guided by rings 11 before extending along the pipe 12 to be submerged, as shown in FIGS. 2 and 3.

Figure 4:
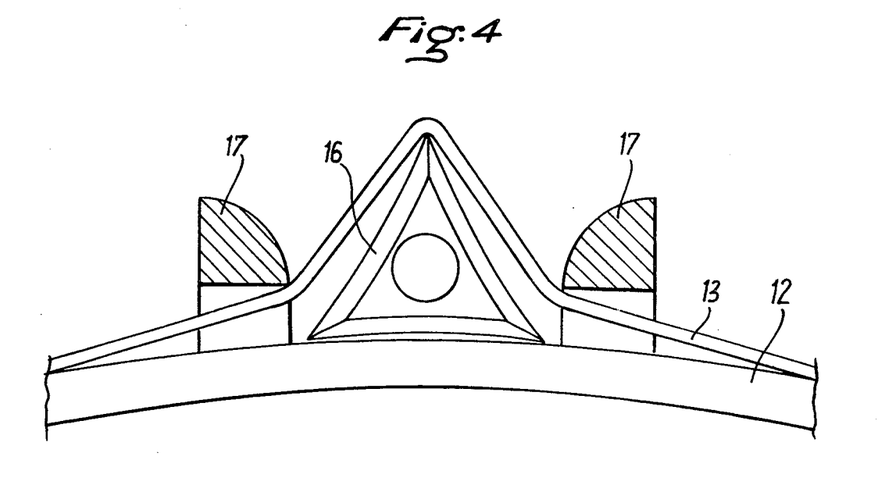
FIG. 4 is a section through a portion of the apparatus shown in FIG. 3.
Figure 5:
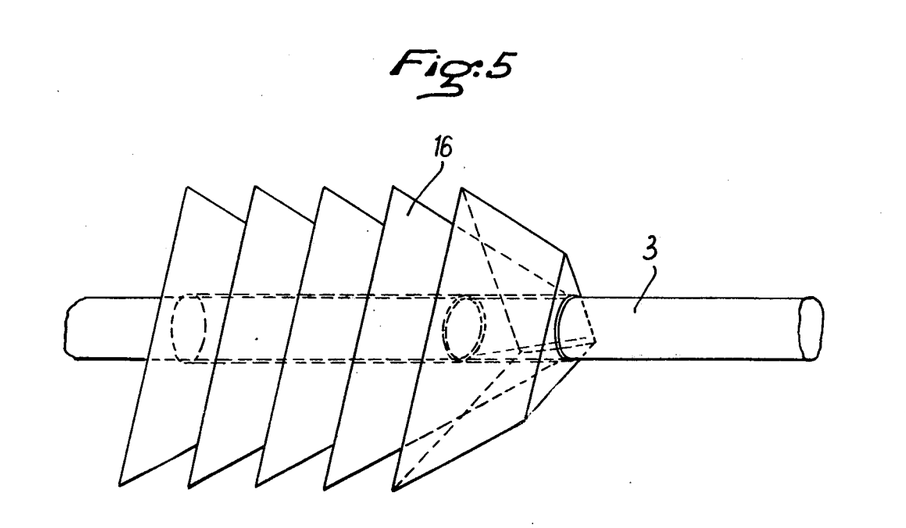
FIG. 5 is a diagrammatic view of the release means shown in FIG. 3.

In these FIGS. it will be seen that the rope 10 from the float 9 is coupled to a flat synthetic strap 13 which passes through ears 14 of a collar 15 placed round the pipe 12. The cable 3 extends between the strap 13 and the pipes and terminates in a series of articulated knives 16. It can be seen that it is sufficient to exert on the cable 3 a sufficiently strong pull when the marker buoy 1 is at the surface, to cause the knives 16 to slice the strap 13. As shown in FIG. 4, the knives 16 are guided by the edges of the two guide-bridges 17 for the strap 13. In this embodiment the knives 16, which are more clearly seen in FIG. 5, are formed by the edges of hollow tetrahedra from which one apex has been cut so that the tetrahedra will nest them and to allow them to be strung on the cable 3.

When the float 9 is connected to the pipe 12 by two buoy-ropes 10 (FIG.2) the knives 16 are arranged to slice through in succession each of the straps 13 connected to the ears 14 on the two collars 13.

Alternatively the float 9 may be connected to the pipe by a single rope 10 which is arranged underneath the central portion of the float.

Figure 6:
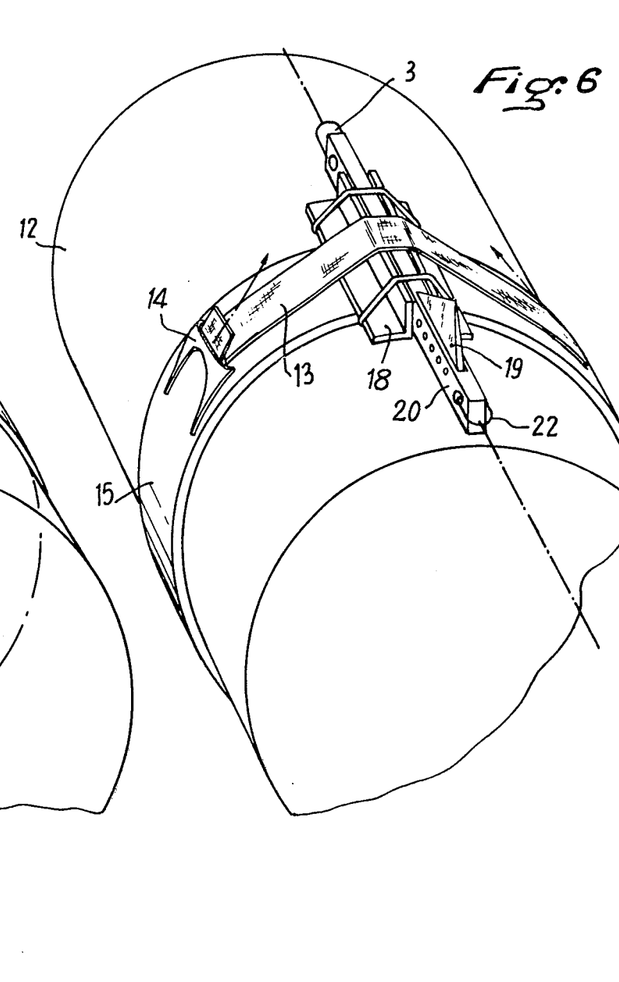
FIG. 6 is a perspective view of another embodiment of release means in accordance with the invention.

In place of the knives 16, a rigid knife may be employed for example as shown in FIG. 6. In this Figure each guide bridge 18 has the shape of an angle iron and the knife 19 is fixed in a support 20 fixed to the release cable 3. The strap 13 may be plaited. If two steps 13 are used, a knife 19 mounted on support 20 may be provided for each strap 13, the cable 3 then continuing as strands 22.

Figure 7:
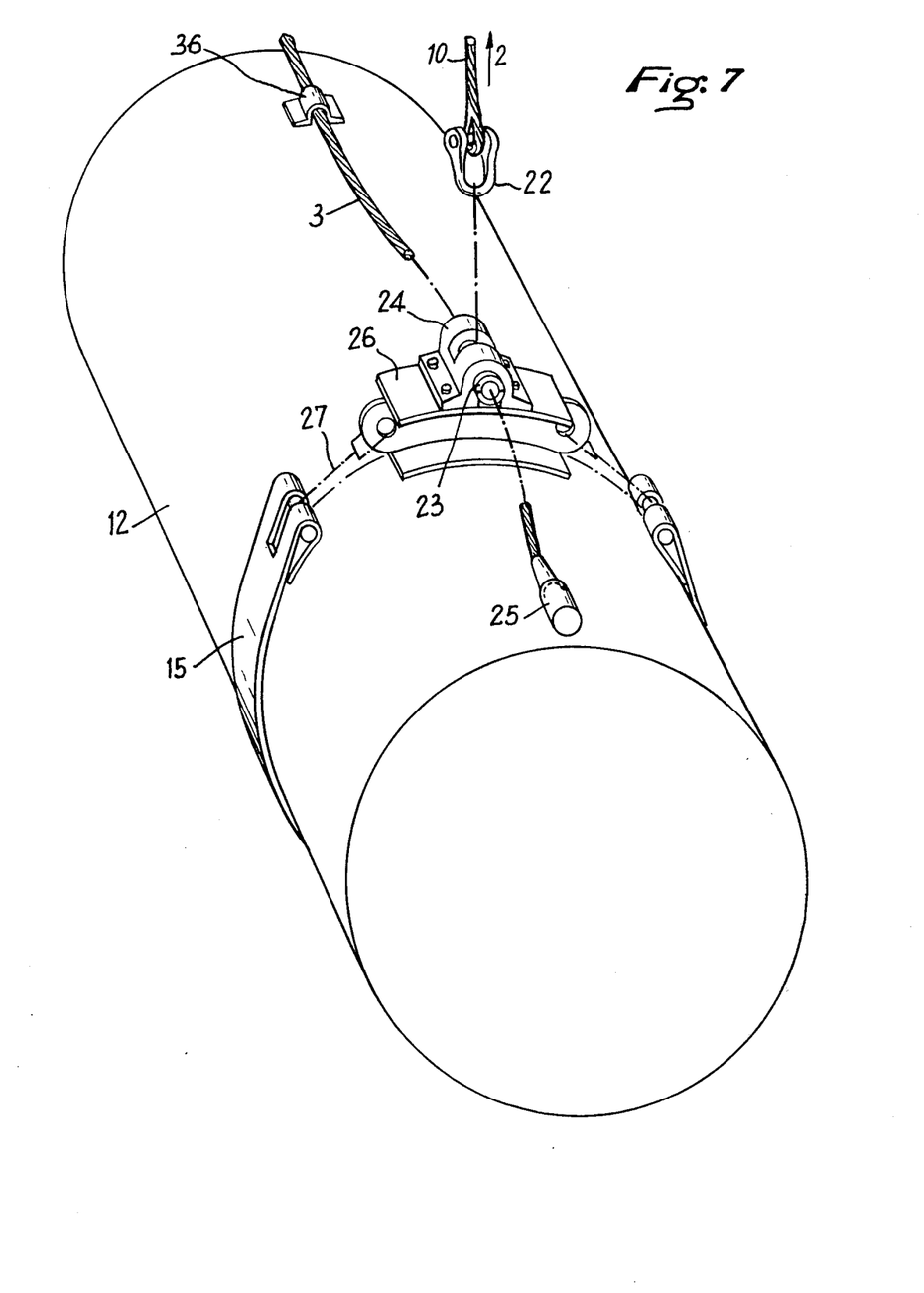
FIG. 7 is a perspective view of a further embodiment of a release means in accordance with the invention.

In the embodiment of FIG. 7 the rope 10 is coupled to the strap 15 by a shackle 22, which plays the same role as the strap 13, and which is held relative to bridge 24 by a splitpin 23 formed of two half-shells. The half-shells of the splitpin 23 are placed round the cable 3 and release of the shackle 22 is effected simply by a pull on the cable 3. To this end, the cable 3 carries, in place of the knife 16 or 19, a body 25 of a size just sufficient to drive the half-shells of the splitpin 23 out of the bridge 24 and to allow it to pass through the bridge. Thus as in the previous embodiments it is sufficient when the marker buoy 1 has risen to the surface to simply exert a pull on the release cable 3 in order to free the buoy rope 10 from the collar 15 on the pipe 12 and thus release the corresponding float 9. In the example chosen the bridge 24 is made fast with an intermediate part 26 bearing against the pipe 12 and connected to the collar 15 by any suitable means, for example, by ties shown diagrammatically at 27 and enabling adequate tightening of the collar 15 on the pipe 12.

Figure 8:
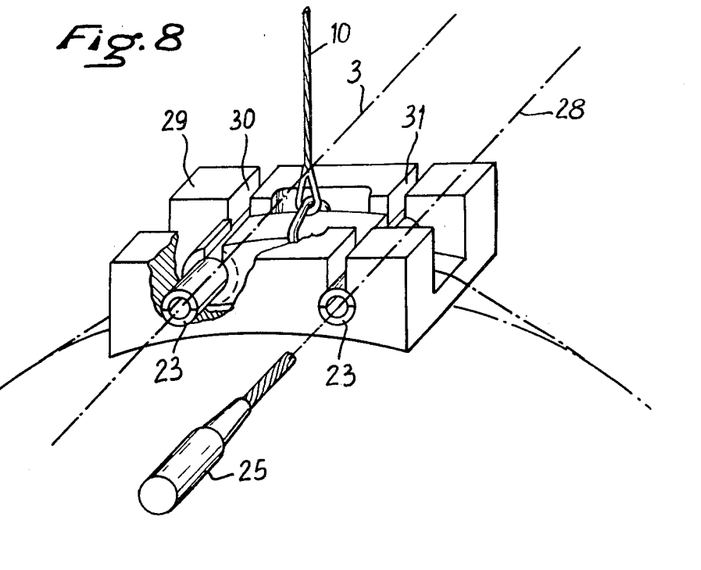
FIG. 8 is a perspective view of a modification of the release means of FIG. 7.
Figure 9:
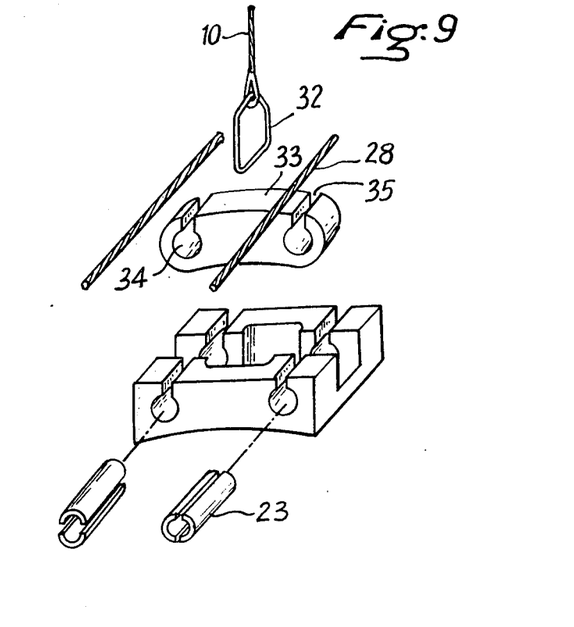
FIG. 9 is an exploded view of the release means of FIG. 8.

In FIGS. 8 and 9 there is shown a release means which enables freeing of the rope 10 either by the release cable 3 of by an auxiliary release cable 28. Only the bridge 24 and the shackle 22 of the embodiment of FIG. 7 have been modified. The bridge 29 has two passageways 30 and 31, one for the cable 3 and the other for the cable 28. The rope 10 is connected to a loop 32 through which is passed a tie-piece 33 having two passageways 34 and 35 which receive splitpins 23 through which pass the cables 3 and 28.

When the cable 3 is carried up by the marker buoy 1 and a pull is exerted on it, its pindriver body 25 frees the passageway 34 in the tiepiece 33 so that the latter is no longer held in the bridge and can pivot about the other splitpin receiving cable 28. Thus pivoting enables the loop 32 to free itself from the tie-piece and hence the float 9 to be released. For controlling the release of the float 9 directly from the laying-barge, the cable 28 is led along the pipe 12 by means of bridges such as 36, FIG. 7. It is then sufficient to pull the cable 28 from the barge to free the passageway 35 in the tie-piece 33 and this time to free the loop 32 by pivoting of the tie-piece 33 about the splitpin receiving cable 3. A release device of this type is of particular interest where conditions may arise necessitating immediate release of one or a number of floats.

It will be appreciated that the above-described method is applicable even when it is desired to free one float only under the exclusive control either of the laying barge or of the recovery vessel. For this purpose the loop 32 may be fixed to the tie-piece 33, so that the rope 10 remains connected to the bridge 29 as long as one of the cables 3 or 28 has not yet been renowned to disengage the corresponding splitpin 23.

The above described method of release of a support float from a load at a given depth by means of an elastic buoy which can be deformed and released through an aperture of predetermined size and is associated with a cable connected to a device for release of the float offers the advantage of being adaptable to substantially every condition of use. Further, independently of these conditions of multiple applications, for the freeing of a single float by one or other of two controls or by putting into effect one or other of these controls or the freeing in succession of a series of floats, the apparatus described above presents perfect safety, the marker buoy and its system of anchorage being protected against damage by the receptacle in which they are enclosed.

What is claimed is:

1. An apparatus for releasing a float supporting a submerged load comprising: a cable, an elastically deformable buoy, said buoy having an attachment point for coupling said cable to said buoy, a housing containing said buoy, an inflation valve capable of being introduced into said housing through an opening in said housing, said buoy inflated to deform under the effect of a predetermined hydrostatic pressure and freely pass through said opening and rise to the surface with said cable attached to it, and means to release said cable from the load.

2. Apparatus as claimed in claim 1, wherein said opening is defined by the internal diameter of a removable ring.

3. Apparatus as claimed in claim 1, werein said housing is fixed to a support float.

4. Apparatus as claimed in claim 1, wherein said means to release are connected to said cable, a float support means connecting said support float to said submerged load, said connecting means operably coupled to said release means.

5. Apparatus as claimed in claim 14, including strap means on said load, said strap means coupled to said connecting means, and said release means comprises at least one knife attached to said cable and positioned to sever said strap means.

6. Apparatus as claimed in claim 4, including a strap around said load coupled to said connecting means, and said release means comprise an assembly of hollow tetrahedra each having one apex removed, the tetrahedra being strung on the cable nesting with one another positioned to pass between said strap and load to sever said strap.

7. Apparatus as claimed in claim 4, including a plurality of deformable buoys, said release means connected to said cable and spaced apart for releasing said plurality of bouys.

8. Apparatus as claimed in claim 4, comprising a housing secured to said submerged load, said release means including a splitpin formed of two half-shells disposed in said housing the cable having a protrusion and passing through the splitpin wherein movement of said protrusion pushes said splitpin from said housing and separates it.

9. Apparatus as claimed in claim 4, wherein said connecting means includes a loop disposed about said submerged load through which said cable passes.

10. Apparatus as claimed in claim 9, wherein said loop is formed in a flat strap secured to said load.

11. Apparatus as claimed in claim 9, wherein said strap secured with a collar which surrounds and is fixed to said load and is supported on two spaced bridges between which said cable passes.

12. Apparatus as claimed in claim 11 wherein said release means comprises knife means for cutting said strap to release said connecting means from said load.

13. Apparatus as claimed in claim 11, wherein said release means comprises knife means for cutting said strap to release said connecting means from said load, said bridges serving as guides for said knife means.

14. Apparatus as claimed in claim 4 wherein said connecting means includes a loop connected to a bridge, said bridge fixed relative to said submerged load by a pin, said pin comprising two half shells between which said cable passes, said release means comprising a body on said cable for engaging said pin and moving it out of engagement in said bridge to release said loop therefrom.

15. Apparatus as claimed in claim 14, wherein said loop is engaged about a tie-piece held relative to said bridge by said pin.

16. Apparatus as claimed in claim 15, wherein said tie-piece is held relative to said bridge by a second pin through which an auxiliary cable is passed, said auxiliary cable bearing a pin engaging body.

* * * * *

UNITED STATES PATENT OFFICE
CERTIFICATE OF CORRECTION

Patent No. 4,067,199      Dated Jan. 10, 1978

Inventor(s) Michel J. Jegousse

It is certified that error appears in the above-identified patent and that said Letters Patent are hereby corrected as shown below:

IN THE HEADING:

[73] Assignees, line 3, after "Societe" insert --- a ---

IN THE SPECIFICATION:

Column 1, line 58, delete "fulfil" and insert --- fulfill ---

Column 2, line 32, after "carried" insert --- out --- line 41, after "according" delete [of] and insert ----- to ---- line 60, and line 61, "FIG. 9 is an exploded view of the release means of FIG. 8" should be a separate paragraph.

Column 3, line 11, after "with" insert ---- the ----

Column 4, line 8, delete [of] and insert --- or --- line 18, delete "pindriver" and insert --- pin-driver -----

UNITED STATES PATENT OFFICE
CERTIFICATE OF CORRECTION

Patent No. 4,067,199      Dated Jan. 10, 1978

Inventor(s)    Michel J. Jegousse

It is certified that error appears in the above-identified patent and that said Letters Patent are hereby corrected as shown below:

Column 4, line 19, delete "tiepiece" and insert --- tie-piece ---

IN THE CLAIMS:

Column 5, line 12, delete "14" and insert --- 4 --- line 22, after "another" insert ---- and ----

Column 6, line 19, after "claim 4" insert ---- , ---

Signed and Sealed this

Twenty-seventh Day of June 1978

[SEAL]

Attest:

RUTH C. MASON  
Attesting Officer

DONALD W. BANNER  
Commissioner of Patents and Trademarks